US009688880B2

(12) United States Patent
Vanier et al.

(10) Patent No.: US 9,688,880 B2
(45) Date of Patent: Jun. 27, 2017

(54) IN SITU ASSEMBLED CRYSTALLINE COLLOIDAL ARRAYS

(71) Applicant: PPG Industries Ohio, Inc., Cleveland, OH (US)

(72) Inventors: Noel R. Vanier, Wexford, PA (US); Xiangling Xu, Pittsburgh, PA (US); Kurt G. Olson, Gibsonia, PA (US); Justin Bohn, Pittsburgh, PA (US); John Donnelly, Monroeville, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 118 days.

(21) Appl. No.: 14/682,420

(22) Filed: Apr. 9, 2015

(65) Prior Publication Data

US 2016/0297993 A1    Oct. 13, 2016

(51) Int. Cl.

| B32B 27/06 | (2006.01) |
| C09D 179/04 | (2006.01) |
| B32B 27/00 | (2006.01) |
| C09D 5/02 | (2006.01) |
| C09D 7/00 | (2006.01) |
| B05D 1/02 | (2006.01) |
| B05D 7/00 | (2006.01) |
| C09D 133/14 | (2006.01) |

(52) U.S. Cl.
CPC ............. *C09D 179/04* (2013.01); *B05D 1/02* (2013.01); *B05D 7/5383* (2013.01); *B32B 27/00* (2013.01); *B32B 27/06* (2013.01); *C09D 5/02* (2013.01); *C09D 7/00* (2013.01); *C09D 133/14* (2013.01); *B32B 2597/00* (2013.01)

(58) Field of Classification Search
CPC .................. B32B 27/06; C09D 5/02

USPC .......................................................... 523/205
See application file for complete search history.

(56) References Cited

U.S. PATENT DOCUMENTS

| 4,644,041 A | 2/1987 | Winnik et al. |
| 7,902,272 B2 | 3/2011 | Ben-Moshe et al. |
| 8,314,163 B2 | 11/2012 | Ganapathiappan |
| 2008/0188381 A1 | 8/2008 | Xu et al. |
| 2011/0135888 A1 | 6/2011 | Xu et al. |
| 2011/0267677 A1 | 11/2011 | Xu et al. |
| 2013/0044365 A1 | 2/2013 | Han et al. |
| 2013/0077169 A1 | 3/2013 | Cheng et al. |

FOREIGN PATENT DOCUMENTS

| WO | 2005026225 A1 | 3/2005 |
| WO | 2014046723 A1 | 3/2013 |

OTHER PUBLICATIONS

McDonald et al., "Emulsion Polymerization of Voided Particles by Encapsulation of a Nonsolvent", Journal of Macromolecules, 2000, pp. 1593-1605, vol. 33.
Nakamura et al., "Optical Properties of Colloidal Crystalline Arrays Composed of Hollow Polystyrene Spheres", Journal of Applied Polymer Science, 2007, pp. 2364-2368, vol. 103.
Yuan et al., "Preparation of Monodispersed Hollow Polymer Particles by Seeded Emulsion Polymerization under Low Emulsifier Conditions", Journal of Applied Polymer Science, 2005, pp. 1505-1510, vol. 98.
Pavlyuchenko et al., "Hollow-Particle Latexes: Preparation and Properties", Journal of Polymer Science: Part A: Polymer Chemistry, 2001, pp. 1435-1449, vol. 39.

*Primary Examiner* — Edward Cain
(74) *Attorney, Agent, or Firm* — Julie Meder

(57) ABSTRACT

A dispersion of monodisperse similarly charged particles, the monodisperse particles having a maximum particle size dispersity of 10% and each particle having a surface with a minimum surface charge density of 1 $\mu C/cm^2$ and comprising pendant steric stabilizing groups.

20 Claims, No Drawings

IN SITU ASSEMBLED CRYSTALLINE COLLOIDAL ARRAYS

FIELD OF THE INVENTION

This invention relates to particles that self-assemble as crystalline colloidal arrays when dispersed in a coating composition.

BACKGROUND OF THE INVENTION

Radiation diffractive materials based on crystalline colloidal arrays have been used for a variety of purposes. A crystalline colloidal array (CCA) is a three-dimensional ordered array of monodispersed colloidal particles. The particles are typically composed of polymer latex, such as polystyrene, or an inorganic material, such as silica.

Such colloidal dispersions of particles can form crystalline structures having lattice spacings that are comparable to the wavelength of ultraviolet, visible, or infrared radiation. These crystalline structures have been used for filtering narrow bands of selected wavelengths from a broad spectrum of incident radiation, while permitting the transmission of adjacent wavelengths of radiation. Alternatively, CCAs are fabricated to diffract radiation for use as colorants, markers, optical switches, optical limiters, and sensors.

SUMMARY OF THE INVENTION

The present invention includes a dispersion of monodisperse similarly charged particles and a coating composition containing such particles, the monodisperse particles having a maximum particle size dispersity of 10% and each particle having a surface with a minimum surface charge density of 1 $\mu C/cm^2$ and comprising pendant steric stabilizing groups.

Also included in the present invention is a method of applying a layer containing a crystalline colloidal array onto a substrate comprising depositing onto at least a portion of a substrate a coating composition comprising monodisperse particles, the monodisperse particles each having a surface, the surfaces bearing the same charge and having pendant steric stabilizing groups, wherein the monodisperse particles self-assemble into a crystalline colloidal array. The invention further includes a method of coating a substrate comprising depositing onto at least a portion of a substrate a dispersion of monodisperse similarly charged particles to form a crystalline colloidal array layer; and depositing another coating composition onto at least a portion of the crystalline colloidal array layer.

DETAILED DESCRIPTION OF THE INVENTION

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is meant to include homopolymer, copolymer, and oligomer. The term "metal" includes metals, metal oxides, and metalloids.

The present invention includes a dispersion of monodisperse similarly charged particles, where the monodisperse particles have a maximum particle size dispersity of 10%, as determined by transmission electron microscopy (TEM). When used herein, particle size dispersity is measured by TEM by producing 5 microliters of a diluted particle dispersion, which is dried at room temperature on a carbon type B coated copper TEM grid. The sample is then analyzed with a Philips CM12 transmission electron microscope operating at 120 kV. Fifty particles are randomly selected using ImageJ software to measure the number average particle diameter and its standard deviation, calibrated with MAG*I*CAL Calibration Reference Standard manufactured by Technoorg Linda. The polydispersity of the particles is calculated by dividing the standard deviation by the number average particle diameter.

Each particle has a surface with a minimum surface charge density of 1 $\mu C/cm^2$ as measured by a conductometric method. As used herein, negative charge density is measured by producing a latex diluted to about 15% solids, which is then mixed with 10 wt. % mixed ion exchange resin (TMD-8 hydrogen and hydroxide form, available from Sigma) at room temperature for 12 hours. After that, the ion exchange resin is filtered away, and the resulting dispersion is dried for one hour at 110° C. to determine the percent solids. About 4 grams of the ion exchanged dispersion is diluted with 25 g deionized water, and titrated with 0.1 N NaOH aqueous solution by a conductometric method. The surface charge density is calculated based on the number average particle size measured by TEM and hence their surface area, the density of the particles, the weight of particles in the titrated dispersion, and hence the total surface area present in the titrated dispersion, and the surface charge neutralized by NaOH. Positive charge density may be determined using a comparable process and titrating with an acid such as hydrochloric acid. The charge density is the surface charge neutralized divided by the total surface area present.

The surfaces of the particles also include pendant steric stabilizing groups. When the particle dispersion of the present invention is included in a coating composition, the particles self-assemble into a crystalline colloidal array (CCA). The self-assembled CCA diffracts radiation in the visible and/or non-visible (ultraviolet or infrared) electromagnetic spectrum according to Bragg's law.

As used herein, when an array of particles is said to diffract radiation or reflect radiation according to Bragg's law, it is meant that at least some incident radiation is diffracted by the crystalline structure of the array, thereby producing some reflected radiation according to Bragg's law and may be referred to as a "Bragg array". The material includes an ordered periodic array of particles that generally satisfies Bragg's law of:

$$m\lambda = 2nd \sin \theta$$

where m is an integer, n is the effective refractive index of the array, d is the distance between the layers of particles, and λ is the wavelength of radiation reflected from a plane of a layer of the particles at angle θ. As used herein, "a" wavelength of diffracted radiation includes a band of the electromagnetic spectrum around that wavelength. For example, reference to a wavelength of 600 nanometers (nm) may include 595 to 605 nm. The present invention is described in reference to a diffraction wavelength or a diffraction peak, which refers to a peak band of reflected radiation that is diffracted by the material of the present invention. Thus, "diffraction wavelength" refers to a band of radiation having wavelengths that generally satisfy Bragg's law.

Diffraction of visible radiation by the self-assembled CCA of the present invention may include at least two optical effects. Firstly, the visible radiation typically is reflected in a narrower wavelength band than the radiation exhibited by a conventional colorant, which may be referred to as exhibiting a "clean" color. Secondly, the self-assembled CCA exhibits an angle dependent color effect whereby the CCA appears one color at one angle (such as "on face" (normal) to the CCA) and another color at a second viewing angle (such as "on flop", i.e. at an angle to the CCA). Thus, the self-assembled CCA of the present invention may be used to provide strong, clear color and/or angle dependent color effect.

The present invention includes a dispersion of monodisperse similarly charged particles. By "monodisperse" is meant that the particles have a maximum particle size dispersity of 10%, meaning that the standard deviation in average particle size as measured via transmission electron microscopy (TEM) is not greater than 10%. The particles may be sized 10-1000 nm. By "similarly charged", it is meant that the particles all have the same charge, either negative or positive. In addition, each particle may have a minimum surface charge density of the surface thereof of at least 1 µC/cm$^2$, such as at least 2 µC/cm$^2$ or such as at least 10 µC/cm$^2$. According to the present invention, the particles comprise pendant steric stabilizing groups. By "pendant" it is meant that the stabilizing groups are polymerized onto the surface of the particles, such as by polymerization of steric stabilizing monomers to form the particles or at least a portion of the particles, such as the outermost portion of the particles. By "steric stabilizing" is meant that the pendant groups provide a stabilizing characteristic whereby the similarly charged particles are maintained spaced apart from each other and are suitable for forming a crystalline colloidal array. For example, the pendant steric stabilizing groups may include polymeric residues having a backbone chain of at least 10 atoms, such as of at least 10 carbon atoms. By "backbone chain" it is meant a non-branched portion of a hydrocarbon chain. For example, the pendant steric stabilizing groups may include residues of polypropylene glycol, polyethylene glycol, polyvinylpyrrolidone, polyvinyl alcohol, poly(hydroxyethyl(meth)acrylate), poly(hydroxypropyl (meth)acrylate), polyacrylic acid, methacrylic acid, polyacrylamide, and/or poly(N-substituted acrylamide) and/or copolymers thereof. The components of the particles, the steric stabilizing groups, and the quantity of steric stabilizing groups may be selected in order to provide for dispersion of the particles in an organic carrier or in water or a mixture thereof.

It has been found that steric stabilized particles of the present invention having a maximum particle dispersity of 10% and a minimum surface charge of 1 µC/cm$^2$ are suitable for in situ assembly of a CCA in a resinous binder of a coating composition. The coating composition may comprise any composition useful in coatings applications, such as those typically used in automotive OEM applications, automotive refinish applications, industrial coating applications, architectural coating applications, electrocoating applications, powder coating applications, coil coating applications, and aerospace coating applications, among others. Resinous binders may include, for example, acrylic polymers, polyesters, polyurethanes, and polyureas. For example, the coating composition in which the steric stabilized particles of the present invention are provided may be a basecoat coating composition (a "basecoat") in a multi-layered coating system, such as in a "color-plus-clear" coating system that includes a colored basecoat and a clear coating composition (a "clearcoat") deposited thereover, where the basecoat may include colorants and/or color effect additives. In the present invention, the steric stabilized particles that self-assemble into a Bragg array may serve as such color and/or effect additives in place of conventional colorants and/or color effect additives in a basecoat of a color-plus-clear coating system or other multi-layered coating system.

In previous systems, CCAs were included in coating compositions as color effect flakes of fixed arrays of particles held in a polymer matrix, in the manner of a colorant or other color effect additive. In contrast, the dispersion of particles of the present invention may be added directly into a coating composition where they self-assemble into CCAs, thereby eliminating the processing step associated with preparing CCA color effect flakes before addition to a coating composition. Conventional monodisperse particles (not bearing a steric stabilizing component) cannot self-assemble in a coating composition due to (1) the interference of charged species present in coating compositions with the surface charged particles and/or (2) the presence of extraneous charged material in the particle dispersion, such as unreacted monomers and/or (3) the presence of other solutes which may destabilize the particles in dispersion. The presence of charged species in the coating composition reduces or prevents the particle-particle interaction between the charged particles that is needed for formation of a CCA using conventional particles and may also destabilize the particle dispersion resulting in premature particle agglomeration prior to crystal formation. One measure of the amount of charged species is the conductivity of the coating composition. For example, melamine resins and glycoluril resins often exhibit conductivity of at least 500 or at least 600 or at least 1000 or at least 1500 µS. While it may be possible to reduce the conductivity of such resins (such as by treatment with ion exchange resins) so that they would not interfere with the self-assembly of certain monodisperse particles when included in a coating composition, the steric stabilized particles of the present invention may be included directly into a conductive coating composition (such as coatings based on melamine and/or glycoluril) without a pretreatment step to lower the conductivity of the coating composition and self-assemble into a CCA. The quantity of steric stabilizing groups used per particle or in a dispersion of particles and/or the steric stabilizing effect of such groups may be selected depending at least in part on the conductivity (i.e. presence of ions) of the coating composition into which they are provided.

Alternatively, a dispersion of the steric stabilized monodisperse particles produced according to the present invention may be deposited directly onto a substrate such that the particles self-assemble into a CCA thereon, where the dispersion may include a solvent. For example, a dispersion of the steric stabilized monodisperse particles may be spray applied to at least a portion of a substrate such that the particles self-assemble into a layer of a CCA. By "layer of a CCA", it is meant that the monodisperse particles are arranged in a Bragg array with the particles packed together such that the particles touch each other yet form interstitial gaps between the portions of the particles that are not touching adjacent particles. The CCA layer may include a two-dimensional array with one layer of particles or a three-dimensional array of multiple layers of particles. The dispersion of steric stabilized monodisperse particles may further include a resinous binder in an amount that only partially fills such gaps between the particles in the CCA layer.

The CCA layer (with unfilled or partially filled interstitial gaps) may be used as a component of a multi-layer coating system, such as a color effect or and/or color imparting layer of a so-called automotive "tri-coat" coating system or other coating system having two, three, four or more layers. For example, a basecoat applied to a substrate may be coated with the CCA layer without baking (curing) the basecoat layer, which is then followed by application of a clearcoat without baking the CCA layer. In this manner, the basecoat, the CCA layer, and the clearcoat are applied in sequential layers, referred to as a "wet on wet on wet" process, with a final single bake to cure all layers in the tri-coat at once. The clearcoat may fill the gaps in the CCA layer as well as serve as a topcoat for the multi-layer coating system. In use, the basecoat composition may be deposited onto at least a portion of a substrate, and a dispersion of the steric stabilized monodisperse particles is deposited over at least a portion of the basecoat composition, such as by spraying to form a CCA. The self-assembled CCA may adhere to the underlying basecoat while the basecoat is still tacky as having not yet been cured. A clearcoat composition may be applied over at least a portion of the CCA layer. In this manner, it should be appreciated that a color effect multi-layered coating system may be produced without using traditional flake color effect materials in a basecoat composition or in a separate coating composition layer. The CCA layer may be produced with little or no added resinous binder, thereby reducing the cost of producing a colored layer compared to conventional multi-layer coating systems.

The color exhibited by a coating composition containing an in situ assembled CCA (e.g., a basecoat in a color-plus-clear coating system) or by a CCA layer as a color effect layer in a tri-coat coating system is generally produced from a more narrow band of wavelengths of visible light than is produced from traditional colorants (pigments and dyes) such that the CCA of the present invention produced from the particle dispersion can be said to exhibit a "clean" color. By virtue of the Bragg diffraction of radiation by the CCA, the CCA further provides a color effect, namely an angle dependent color effect. Thus, the CCA layer not only exhibits a clean color and unique color effect, it is believed that a CCA produced from the particle dispersion of the present invention provides a more consistent color effect compared to flake-containing coating compositions which rely on the composite effect of distinct flakes in discreet positions within the coating as is typically used in such multi-layered coating systems.

The particles may have a generally unitary structure. As used herein, "unitary structure" refers to a feature of the particles whereby each particle has a generally uniform structure without distinct component structures, although the composition thereof may vary through the unitary particles, such as may occur upon diffusion of a solvent or matrix material therein. Alternatively, the particles may have a core-shell structure where the core is produced from a different composition than the shell composition. In addition, the shell may include a single layer or may include multiple layers such as two, three, four, or more layers of successive shells, collectively referred to as a "shell" herein, unless otherwise specified. Suitable compositions for a unitary particle or for the particle core include polymers, such as polystyrene, polyurethane, acrylic polymers, alkyd polymers, polyester, siloxane-containing polymers, polysulfides, epoxy-containing polymers, or polymers derived from epoxy-containing polymers, as well as inorganic materials, such as metal oxides (e.g., alumina, silica, or titanium dioxide) or semiconductors (e.g., cadmium selenide). Suitable compositions for the shell include organic polymers (e.g., polystyrene, polyurethane, acrylic polymers, alkyd polymers, polyester, siloxane-containing polymers, polysulfides, epoxy-containing polymers, or polymers derived from epoxy-containing polymers), with the composition of the particle shell differing from the matrix material for a particular array of the core-shell particles. The shell material may be non-film-forming (i.e. cured or crosslinked), meaning that the shell material remains in position surrounding a particle core without forming a film of the shell material so that the core-shell particles remain as discrete particles. Alternatively, the shell composition may be film-forming whereby the shell composition forms a film around the cores. For particles having non-film-forming shells or film-forming shells, the core composition and the shell composition have different indices of refraction. In addition, the refractive index of the shell may vary as a function of the shell thickness in the form of a gradient of refractive index through the shell thickness. The refractive index gradient may be a result of a gradient in the composition of the shell through the shell thickness. For particles that are generally spherical, the diameter of the core may constitute 85 to 95% of the total particle diameter or 90% of the total particle diameter with the shell constituting the balance of the particle diameter and having a radial thickness dimension.

In order to produce charged particles according to the present invention, ionic monomers are included in the reaction mixture for the unitary particle or for at least the shell in a core-shell particle. The ionic monomer becomes incorporated into the polymer forming the particles, thereby producing charged particles. The ionic monomer may be or may not be a surfactant, such as sodium styrene sulfonate. Particularly useful ionic monomers are those that are minimally soluble in the dispersing fluid (e.g., water) of the particle dispersion. By "minimally soluble" it is meant that its solubility in water is less than 30 wt. % at 25° C. As a result, any subsequent purification of the monodispersion is enhanced because a high percentage of ionic monomer becomes incorporated into the particle and remains in the dispersion. Incorporation of an ionic monomer in the polymeric particles increases the surface charge of the particles and improves the integrity and robustness of an array of the particles.

For core-shell particles, the cores may be produced via emulsion polymerization of core-precursor monomers in the presence of a surfactant, yielding a dispersion of the cores. Suitable surfactants for dispersion of organic polymer particles include, but are not limited to, sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion. Shell monomers are added to the core particle dispersion, along with a surfactant (as described above), such that the shell monomers polymerize onto the core particles. One or more shells may be layered onto the particle cores. The core-shell particles may be purified from the dispersion by filtration, such as ultra-filtration, to produce a monodispersion of charged core-shell particles.

Unitary-structured particles may be produced by dispersing monomers with initiators in a solution to produce unitary particles as described above with regard to preparing the cores of the core-shell particles. A dispersion of the unitary particles may be filtered as described above to produce a dispersion of the charged unitary particles.

The particles may comprise hollow particles. By "hollow particles" is meant that the particles include a shell and define a core which is hollow and contains air or other gas or gasses. Hollow particles may be produced from various compositions, including, but not limited to, organic polymers such as polystyrene, polyurethane, acrylic polymers, alkyd polymers, polyesters, siloxane-containing polymers, polysulfides, epoxy-containing polymers, and inorganic materials such as metal oxides (e.g., alumina, silica, zinc oxide, or titanium dioxide) or composites of these materials. The hollow particles may be produced by a solvent encapsulation or produced by swelling in an acid or a base. Solvent encapsulation involves an emulsion polymerization process that encapsulates a nonsolvent hydrocarbon for the polymer being formed. A low molecular weight polymer phase separates in a dispersed hydrocarbon-monomer mixture. After evaporation of the solvent, the resulting monodispersed particles may define a plurality of voids or a single void. A suitable process for producing hollow particles by solvent encapsulation is described in McDonald et al., *Macromolecules*, 2000, 33, 1593-1605.

Hollow particles may be prepared by swelling with an acid or base according to the process described in Pavlyuchenko et al., *Journal of Polymer Science*, Part A: Polymer Chemistry, Vol. 39, 1435-1449 (2001) and/or Cai-Deng Yuan et al., *Journal of Applied Polymer Science*, Vol. 98, 1505-1510 (2005). A core latex particle is encapsulated with at least one polymer shell. The particle is treated with a swelling component (e.g., an aqueous base) that expands both the core and shell. Upon drying and crosslinking the shell, the core shrinks to yield one or more voids within the crosslinked shell. A seed core particle may be encapsulated with at least three shells, and the seed core is subsequently neutralized with a swelling component (to produce an internal void) with crosslinking of at least one of the shells. The size of such multi-shelled hollow particles, and thus the diffraction wavelength of a CCA produced therefrom, may be controlled by the size of the original seed core particle and/or the thickness and quantity of shells. For example, smaller seed core particles result in smaller diameter hollow particles that, when arranged in a CCA, reflect at a shorter diffraction wavelength (e.g. blue light) while larger seed core particles may be used to produce larger hollow particles and CCAs that reflect longer diffraction wavelengths such as green or red light, thereby providing the ability to select the diffraction wavelength of CCAs.

Suitable surfactants for producing a dispersion of hollow particles include, but are not limited to, sodium dodecylbenzene sulfonate (SDBS), sodium lauryl sulfonate (SLS), DOWFAX™ surfactants from the Dow Chemical Company, dihexyl sodium sulfosuccinate (commercially available as MA-80 from American Cyanamid Co.), dioctyl sodium sulfosuccinate (commercially available as AOT-75 from Air Products Co.), ammonium alkyl ether sulfate (commercially available as Disponsil FES from Cognis), sodium styrene sulfonate, sodium 1-allyloxy-2-hydroxypropyl sulfonate (commercially available as Sipomer COPS-I from Rhodia Corporation), acrylamide propyl sulfonate, and sodium allyl sulfonate. Particularly useful surfactants are those that are minimally soluble in the dispersing fluid (e.g., water) of the particle dispersion.

The charged particles are purified from the dispersion by filtration, such as ultra-filtration, to remove undesired materials, such as unbound ionic monomer, other unreacted monomer, small polymers, water, initiator, and unbound salt and grit (agglomerated particles), to produce a monodispersion of charged particles in the form of a latex, i.e. a colloidal dispersion of polymeric particles. When such particles are in a dispersion with other materials, such as unbound ionic monomer, the repelling forces of the charged particles can be mitigated, therefore, the particle dispersion is purified to essentially contain only the charged particles, which then readily repel each other and form an ordered array. Upon removal of the excess raw material by-products, solvent, and the like, electrostatic repulsion of the charged particles causes the particles to align themselves into an ordered array.

A dispersion of steric stabilized monodisperse particles bearing pendant steric stabilizing groups may then be incorporated into a coating composition such that a CCA is self-assembled from the monodisperse charged particles when the coating composition is applied to a substrate. The coating composition may further include additional conventional colorants such as pigments, dyes, metal flake, or the like. Alternatively, the dispersion of steric stabilized monodisperse particles may be applied as a layer onto a substrate, either alone or along with a resinous binder.

Illustrating the invention are the following examples that are not to be considered as limiting the invention to their details. All parts and percentages in the examples, as well as throughout the specification, are by weight unless otherwise indicated.

EXAMPLES

Example 1

Core-Shell Particle Dispersion with MPEG 350 MA

Part 1A: Particle Core Latex

A seed core particle latex was prepared as follows. Deionized (DI) water (1431 g) was first charged into a four-necked round-bottom flask fitted with a thermocouple, mechanical stirrer, and condenser, and then heated up to 80° C. under an $N_2$ blanket. Once the temperature reached 80° C., a mixture of 4.05 g of ammonium persulfate and 48.6 g of DI water was charged into the flask and mixed for 15 minutes. Then, a pre-emulsion of 40.5 g of DI water, 5.4 g of Disponil FES 993 (an emulsifier, available from BASF), and 59.4 g of methyl methacrylate (MMA), was charged all at once into the flask and held at 80° C. for 30 minutes. After holding was completed, a pre-emulsion of 390.7 g of DI water, 4.37 g of SR 550 (methoxy polyethylene glycol (350) monomethacrylate, "MPEG 350 MA" available from Sartomer Americas), 13.0 g of Disponil A 1080 (a nonionic surfactant, available from BASF), 17.48 g of Disponil FES 993, 206.5 g of methacrylic acid (MAA), and 387.4 g of MMA, was charged into the flask over 4 hours. After the charge was completed, it was held at 80° C. for an additional 30 minutes before being cooled to room temperature.

Part 1B: Three-Shell Hollow Particle Dispersion

Hollow particles were prepared using the particle core latex produced in Part 1A as follows. DI water (1398 g) was first charged into a four-necked round-bottom flask fitted with a thermocouple, mechanical stirrer, and condenser, and then heated up to 85° C. under an N2 blanket. Once the temperature reached 85° C., a mixture of 3 g of ammonium persulfate and 30.0 g of DI water was charged into the flask, and then 240 g of the seed core particle latex from Example 1 was charged into the flask, followed by 57 g DI water. The mixture was held at 77° C. for 10 minutes.

Three shells were formed over the core particles by charging into the flask (over 60 minutes) a first monomer charge of a pre-emulsion of 76.5 g of DI water, 1.80 g of sodium dodecylbenzenesulfonate (SDBS), 9.0 g of MAA, 60.0 g of MMA, 1.5 g of divinyl benzene (DVB), and 84.0 g of styrene. Immediately after the first monomer charge was completed, a second monomer charge of a pre-emulsion of 255.0 g of DI water, 2.25 g of ammonium persulfate, 3.3 g of SDBS, 12.0 g of MAA, 6.0 g SR550 (MPEG 350 MA), 3.0 g of DVB, and 600.0 g of styrene, was charged over 90 minutes into the flask. After that, the mixture was heated up to 90° C. and held at 90° C. for 15 minutes. After holding, a third monomer charge of a pre-emulsion of 90.0 g of DI water, 0.90 g sodium dodecylbenzenesulfonate (SDBS), 0.6 g of Ionol (2,6 di-tertiary butyl paracresol, available from Shell Chemical Company), 90.0 g of DVB, 12.0 g SR550 (MPEG 350 MA), 1.20 g of sodium styrene sulfonate (SSS) from Aldrich Chemical Company, Inc., and 75 g of styrene, was charged into the flask over 10 minutes.

A mixture of 37.5 g of 30% ammonia solution and 135 g of DI water was charged into the flask over 15 minutes and held at 90° C. for 3 hours to swell the core and shells of the latex particles. The latex was cooled down to 77° C., and a mixture of 3.0 g of t-butyl hydroperoxide (70%) and 21.0 g of DI water was charged into the flask all at once. A mixture of 3.0 g of ascorbic acid and 90 g of DI water was then charged over 15 minutes to polymerize the styrene in the shells. The latex was then held at 77° C. for 30 minutes before being cooled to room temperature, yielding a latex dispersion of multi-shelled hollow particles. The resulting dispersion (believed to exhibit a maximum particle size dispersity of 10% with a minimum surface charge on the particles of 1 $\mu C/cm^2$) was filtered through a five-micron bag filter.

Comparative Example 2

Three-Shell Hollow Particle Dispersion

Example 1 was repeated except that 6 g of SR 550 (methoxy polyethylene glycol (350) monomethacrylate) was charged in the third monomer charge of pre-emulsion in Part 1B of Example 1.

Example 3

In Situ CCA Assembly

The latexes of Example 1 and Comparative Example 2 were ultra-filtered to a conductivity of less than 400 μS. A portion of each of the filtered latexes was further cleaned with TMD-8 (hydrogen and hydroxide form) mixed bed resin (#M8157) from Sigma Aldrich Co. LLC.

A modified glycoluril resin in water (CYMEL 1172 from Cytec Industries Inc.) was utilized as a binder to demonstrate in situ CCA formation in a coating. The binder had a conductivity of 605 μS as received. A sample of the binder was also cleaned with TMD-8 resin to reduce the conductivity to 1 μS. The formula for producing drawdowns using a #22 Bar included 1.83 g latex, 0.89 g binder, and 0.01 g BYK-348 (polyether modified dimethyl polysiloxane available from Byk-Chemie). The drawdowns were allowed to air dry then placed in 90° C. oven for 30 minutes to cure. A comparison was made between Example 1 (6.7 wt. % MPEG 350 in third shell) and Example 2 (3.4 wt. % MPEG 350 in third shell) at high binder conductivity (605 μS) and low binder conductivity (1 μS).

The results reported in Table 1 show that the CCA produced in situ from the latex of Example 1 exhibited a bright red color (demonstrating good CCA assembly) after cure of the binder at both high and low conductivity. The ionic strength of the binder had no effect on self-assembly. The CCA produced in situ from the latex of Comparative Example 2 (lower level of MPEG 350 in the third shell than Example 1) did not exhibit the same result. In the low conductivity binder, the particles from Comparative Example 2 produced a bright red color (good CCA assembly), but, when dispersed in a high conductivity binder, no color was obtained (no CCA assembly). In separate experiments, particles without steric stabilization (no MPEG 350 MA in the third shell) were also found to assemble only in low conductivity binder. As such, in this situation, more than 3.4 wt. % MPEG 350 (such as at least 6.7 wt. %) was needed to permit self-assembly of the particles.

TABLE 1

| Hollow three-shell latex | Example 1 (6.7 wt. % MPEG 350 in outer shell) | Comparative Example 2 (3.4 wt. % MPEG 350 in outer shell) |
| --- | --- | --- |
| Low conductivity binder (1 μS) | Good | Good |
| High conductivity binder (605 μS) | Good | No color |

Example 4

Core-Shell Particle Dispersion with MPEG 2005

Part 4A: Particle Core Latex

A particle core latex was prepared as follows. Deionized (DI) water (1431 g) was first charged into a four-necked round-bottom flask fitted with a thermocouple, mechanical stirrer, and condenser, and then heated up to 80° C. under an N2 blanket. Once the temperature reached 80° C., a mixture of 4.5 g of ammonium persulfate and 48.6 g of DI water was charged into the flask and mixed for 15 minutes. Then, a pre-emulsion of 40.5 g of DI water, 6.75 g of Disponil FES 993, and 59.4 g of methyl methacrylate (MMA), was charged all at once into the flask and held at 80° C. for 30 minutes. After holding was completed, a pre-emulsion of 284.2 g of DI water, 3.17 g of SR 550 (methoxy polyethylene glycol (350) monomethacrylate), 9.45 g of Disponil A 1080, 12.69 g of Disponil FES 993, 5.4 g Thiocure® PETMP (pentaerythritol tetraskis (3-mercaptopropionate) available from Bruno Bock Chemische Fabrik GmbH), 150.2 g of methacrylic acid (MAA), and 324.6 g of MMA, was charged into the flask over 4 hours. After the charge was completed, it was held at 80° C. for an additional 30 minutes before being cooled down to room temperature.

Part 4B: Hollow Particle Dispersion

Hollow particles were prepared using the particle core latex produced in Part 4A as follows. DI water (1398 g) was first charged into a four-necked round-bottom flask fitted with a thermocouple, mechanical stirrer, and condenser, and then heated to 85° C. under an N2 blanket. Once the temperature reached 85° C., a mixture of 3 g of ammonium persulfate and 30.0 g of DI water was charged into the flask, and then 240 g of the seed core particle latex from Part 4A was charged into the flask, followed by 57 g DI water. The mixture was held at 77° C. for 10 minutes.

Three shells were formed over the seed particles by charging into the flask (over 60 minutes) a first monomer charge of a pre-emulsion of 76.5 g of DI water, 1.80 g of sodium dodecylbenzenesulfonate (SDBS), 9.0 g of MAA, 60.0 g of MMA, 1.5 g of DVB, and 84.0 g of styrene Immediately after the first monomer charge was completed, a second monomer charge of a pre-emulsion of 255.0 g of DI water, 2.25 g of ammonium persulfate, 3.3 g of SDBS, 12.0 g of MAA, 6.0 g of SR 550 (MPEG 350), 12.0 g of DVB, and 600.0 g of styrene was charged over 90 minutes into the flask. After that, the mixture was heated up to 90° C. and held at 90° C. for 15 minutes. After holding, a third monomer charge of a pre-emulsion of 90.0 g of DI water, 1.5 g of Reasoap SR-10 (reactive surfactant form Adeak), 0.6 g of Ionol, 90.0 g of DVB, and 0.6 g of SSS, 18.0 g MPEG 2005 MA W (methoxypolyethylene glycol 2000 methacrylate, 50% in water; available from Evonik Industries) (5.1 wt. %), and 75 g of styrene, was charged into the flask over 10 minutes. A mixture of 37.5 g of 30% ammonia solution and 135.0 g of DI water was charged into the flask over 15 minutes and held at 90° C. for 3 hours to swell the core and shells of the latex particles. The latex was cooled down to 77° C., and a mixture of 3.0 g of t-butyl hydroperoxide (70%) and 21.0 g of DI water was charged into the flask all at once. A mixture of 3.0 g of ascorbic acid and 90.0 g of DI water was then charged over 15 minutes to polymerize the styrene in the shell. The latex was then held at 77° C. for 30 minutes before being cooled to room temperature, yielding a latex dispersion of multi-shelled hollow particles. The resulting dispersion (believed to exhibit a maximum particle size dispersity of 10% with a minimum surface charge on the particles of 1 µC/cm$^2$) was filtered through a five-micron bag filter.

Example 5

In Situ CCA Assembly of High Ionic Strength Particle Dispersion

The hollow particle dispersion of Example 4 containing 5.1 wt. % MPEG 2005 in the third shell was cleaned with TMD-8 ion exchange resin, filtered, and then drawdown on black Leneta paper, air dried, and then warmed in an 85° C. oven for 5 minutes. This sample was then overcoated with a clearcoat of SR9003 (propoxylated neopentyl glycol diacrylate or PONPGDA) esters from SARTOMER with 3 wt. % UV activator (diphenyl(2,4,6-trimethylbenzoyl)phosphine oxide/2-hydroxy-2-methylpropiophenome blend) from Aldrich #405663. After laminating with a clear PET cover sheet, the overcoat was then UV cured for 1 minute at 99% power using a CF1000 Clearstone UV source. A very bright green color was observed indicating good CCA assembly as reported in Table 2.

Another latex drawdown was performed with the hollow particle dispersion of Example 4 but without cleaning, i.e. as is from the reaction without removal of ions from the reaction mixture. It was allowed to air dry and then cured in oven at 85° C. for 5 minutes to drive off water. The dried sample was then UV overcoated with a clearcoat of SR9003. As reported in Table 2, a very bright green color was again observed. The high ionic strength from the ions in the reaction mixture did not affect CCA assembly. The steric stabilization afforded by the larger MPEG 2005 (compared with the MPEG 350) enabled CCA assembly even without cleaning (ion removal).

TABLE 2

| CCA assembly of Example 4 particle dispersion | | |
| --- | --- | --- |
| Ion exchange treated particle dispersion | Yes | No |
| CCA assembly in UV curable coating | Good | Good |

Example 6

Core-Shell Particle Dispersion

Part 6A: Particle Core Latex

A particle core latex was prepared as follows. DI water (1431 g) was first charged into a four-necked round-bottom flask fitted with a thermocouple, mechanical stirrer, and condenser, and then heated up to 80° C. under an N2 blanket. Once the temperature reached 80° C., a mixture of 4.05 g of ammonium persulfate and 48.6 g of DI water was charged into the flask and mixed for 15 minutes. A pre-emulsion of 40.5 g of DI water, 6.75 g of Disponil FES 993, and 59.4 g of MMA was charged all at once into the flask and held at 80° C. for 30 minutes. After holding was completed, a pre-emulsion of 369.43 g of DI water, 4.12 g of SR 550 (methoxy polyethylene glycol (350) monomethacrylate, 12.29 g of Disponil A 1080, 16.5 g of Disponil FES 993, 7.02 g Thiocure® PETMP (pentaerythritol tetraskis (3-mercaptopropionate) available from Bruno Bock Chemische Fabrik GmbH), 195.33 g of MAA, and 422.08 g of MMA was charged into the flask over 4 hours. After the charge was completed, it was held at 80° C. for an additional 30 minutes before being cooled down to room temperature.

Part 6B: Three-Shell Hollow Particle Dispersion

Hollow particles were prepared using the particle core latex produced in Part 6A as follows. DI water (1398 g) was first charged into a four-necked round-bottom flask fitted with a thermocouple, mechanical stirrer, and condenser, and then heated up to 85° C. under an N2 blanket. Once the temperature reached 85° C., a mixture of 3 g of ammonium persulfate and 30.0 g of DI water was charged into the flask, and then 207 g of the particle core latex from Example 6A was charged into the flask, followed by 57 g DI water. The mixture was held at 77° C. for 10 minutes.

Three shells were formed over the particle cores by charging into the flask (over 60 minutes) a first monomer charge of a pre-emulsion of 76.5 g of DI water, 1.80 g of sodium dodecylbenzenesulfonate (SDBS), 9.0 g of MAA, 60.0 g of MMA, 1.5 g of divinyl benzene (DVB), and 84.0 g of styrene. Immediately after the first monomer charge was completed, a second monomer charge of a pre-emulsion of 255.0 g of DI water, 2.25 g of ammonium persulfate, 3.3 g of SDBS, 12.0 g of MAA, 6.0 g SR550 (MPEG 350 MA), 12.0 g of DVB, and 600.0 g of styrene was charged over 90 minutes into the flask. After that, the mixture was heated up to 90° C. and held at 90° C. for 15 minutes. After holding, a third monomer charge of a pre-emulsion of 90.0 g of DI water, 6.0 g SR-10 (AW-11-8886), 0.6 g of Ionol (2,6 di-tertiary butyl paracresol, available from Shell Chemical Company), 90.0 g of DVB, 9.0 g ERS 01596 (reactive surfactant available from ETHOX Chemicals, LLC), 0.60 g of SSS, and 75 g of styrene was charged into the flask over 10 minutes.

A mixture of 37.5 g of 30% ammonia solution and 135 g of DI water was charged into the flask over 15 minutes and held at 90° C. for 3 hours to swell the core and shells of the latex particles. The latex was cooled down to 77° C., and a mixture of 3.0 g of t-butyl hydroperoxide (70%) and 21.0 g of DI water was charged into the flask all at once. A mixture of 3.0 g of ascorbic acid and 90 g of DI water was then charged over 15 minutes to polymerize the styrene in the shells. The latex was then held at 77° C. for 30 minutes before being cooled to room temperature, yielding a latex dispersion of multi-shelled hollow particles. The resulting dispersion (believed to exhibit a maximum particle size dispersity of 10% with a minimum surface charge on the particles of 1 µC/cm$^2$) was filtered through a five-micron bag filter.

Example 7

In Situ CCA Assembly of High Ionic Strength Particle Dispersion

The hollow particle dispersion of Example 6 containing 9.0 g ERS01596 in the third shell was drawn down without cleaning (i.e. as is from the reaction without removal of ions from the reaction mixture) on black Leneta paper, air dried, and then warmed in an 85° C. oven for 5 minutes. This sample was then overcoated with a clearcoat of SR9003. After laminating with a clear PET cover sheet, the overcoat was then UV cured for 1 minute at 99% power using a CF1000 Clearstone UV source. A very bright green color was observed indicating good CCA assembly as reported in Table 3. The high ionic strength resulting from the ions in the reaction mixture did not affect CCA assembly. The steric stabilization afforded by the larger ERS 01596 (compared with the MPEG 350) enabled CCA assembly without cleaning (no ion removal via ion exchange treatment).

TABLE 3

| CCA assembly of Example 6 particle dispersion | |
|---|---|
| Ion exchange treated particle dispersion | No |
| CCA assembly in UV curable coating | Good |

The present invention further includes the subject matter of the following clauses.

Clause 1: A dispersion of monodisperse similarly charged particles, said monodisperse particles having a maximum particle size dispersity of 10% and each particle having a surface with a minimum surface charge density of 1 µC/cm$^2$ and comprising pendant steric stabilizing groups.

Clause 2: The dispersion of clause 1, wherein said pendant steric stabilizing groups comprise polymeric residues having a backbone chain of at least 10 atoms.

Clause 3: The dispersion of clause 1 or 2, wherein said pendant steric stabilizing groups comprise residues of polypropylene glycol, polyethylene glycol, polyvinylpyrrolidone, polyvinyl alcohol, poly(hydroxyethyl(meth)acrylate), poly(hydroxypropyl(meth)acrylate), polyacrylic acid, methacrylic acid, polyacrylamide, and/or poly(N-substituted acrylamide) and/or copolymers thereof.

Clause 4: The dispersion of any one of clauses 1-3, wherein said dispersion comprises a solvent.

Clause 5: The dispersion of any one of clauses 1-4, wherein said solvent comprises water and/or an organic compound.

Clause 6: The dispersion of any one of clauses 1-5, wherein at least some of said particles comprise a shell defining a hollow core.

Clause 7: A coating composition comprising monodisperse particles, said particles each having a surface with a minimum surface charge density of 1 µC/cm$^2$ and comprising pendant steric stabilizing groups; and a resinous binder.

Clause 8: The coating composition of clause 7, further comprising a solvent.

Clause 9: The coating composition of clause 7 or 8, wherein the particles are self-assembled in crystalline colloidal arrays.

Clause 10: The coating composition of any one of clauses 7-9, further comprising a pigment.

Clause 11: The coating composition of any one of clauses 7-10, wherein said pendant steric stabilizing groups comprise residues of polypropylene glycol, polyethylene glycol, polyvinylpyrrolidone, polyvinyl alcohol, poly(hydroxyethyl (meth)acrylate), poly(hydroxypropyl(meth)acrylate), polyacrylic acid, methacrylic acid, polyacrylamide, and/or poly (N-substituted acrylamide) and/or copolymers thereof.

Clause 12: The coating composition of any one of clauses 7-11, wherein said particles are self-assembled in a crystalline colloidal array that Bragg diffracts radiation.

Clause 13: The coating composition of any one of clauses 7-12, wherein the resinous binder comprises melamine resin.

Clause 14: A method of applying a layer containing a crystalline colloidal array onto a substrate, comprising depositing onto at least a portion of a substrate a composition comprising monodisperse particles, said monodisperse particles each having a surface, said surfaces bearing the same charge and having pendant steric stabilizing groups, wherein the monodisperse particles self-assemble into a crystalline colloidal array.

Clause 15: The method of clause 14 wherein the particle surfaces have a minimum charge density of 1 µC/cm$^2$.

Clause 16: The method of clause 14 or 15 wherein said pendant steric stabilizing groups comprise residues of polypropylene glycol, polyethylene glycol, polyvinylpyrrolidone, polyvinyl alcohol, poly(hydroxyethyl(meth)acrylate), poly(hydroxypropyl(meth)acrylate), polyacrylic acid, methacrylic acid, polyacrylamide, and/or poly(N-substituted acrylamide) and/or copolymers thereof.

Clause 17: The method of any one of clauses 14-16 wherein the coating composition further comprises a resinous binder.

Clause 18: A method of coating a substrate comprising depositing onto at least a portion of a substrate the dispersion of particles of clause 1 to form a crystalline colloidal array layer; and depositing another coating composition onto at least a portion of the crystalline colloidal array layer.

Clause 19: The method of clause 18 wherein the other coating composition is a clearcoat composition.

Clause 20: The method of clause 18 or 19 further comprising depositing a first coating composition onto the substrate portion and depositing the dispersion of particles onto at least a portion of the first coating composition.

Clause 21: The method of any one of clauses 18-20 wherein the dispersion of particles further comprises a resinous binder.

Clause 22: The method of any one of clauses 18-21 wherein said step of depositing the dispersion of particles comprises spraying the dispersion of particles.

Whereas particular embodiments of this invention have been described above for purposes of illustration, it will be evident to those skilled in the art that numerous variations of the details of the present invention may be made without departing from the invention as defined in the appended claims.

The invention claimed is:

1. A dispersion of monodisperse similarly charged particles, said monodisperse particles having a maximum particle size dispersity of 10% and each particle having a surface with a minimum surface charge density of 1 $\mu C/cm^2$ and comprising more than 3.4 wt. % of pendant steric stabilizing groups.

2. The dispersion of claim 1, wherein said pendant steric stabilizing groups comprise polymeric residues having a backbone chain of at least 10 atoms.

3. The dispersion of claim 2, wherein said pendant steric stabilizing groups comprise residues of polypropylene glycol, polyethylene glycol, polyvinylpyrrolidone, polyvinyl alcohol, poly(hydroxyethyl(meth)acrylate), poly(hydroxypropyl(meth)acrylate), polyacrylic acid, methacrylic acid, polyacrylamide, and/or poly(N-substituted acrylamide) and/or copolymers thereof.

4. The dispersion of claim 1, wherein said dispersion comprises a solvent.

5. The dispersion of claim 4, wherein said solvent comprises water and/or an organic compound.

6. The dispersion of claim 1, wherein at least some of said particles comprise a shell defining a hollow core.

7. A coating composition comprising:
monodisperse particles, said particles each having a surface with a minimum surface charge density of 1 $\mu C/cm^2$ and comprising greater than 3.4 wt. % of pendant steric stabilizing groups; and a resinous binder.

8. The coating composition of claim 7, further comprising a solvent.

9. The coating composition of claim 7, wherein the particles are self-assembled in crystalline colloidal arrays.

10. The coating composition of claim 7, wherein said pendant steric stabilizing groups comprise residues of polypropylene glycol, polyethylene glycol, polyvinylpyrrolidone, polyvinyl alcohol, poly(hydroxyethyl(meth)acrylate), poly(hydroxypropyl(meth)acrylate), polyacrylic acid, methacrylic acid, polyacrylamide, and/or poly(N-substituted acrylamide) and/or copolymers thereof.

11. The coating composition of claim 7, wherein the resinous binder comprises melamine resin.

12. A method of applying a layer containing a crystalline colloidal array onto a substrate comprising:
depositing onto at least a portion of a substrate a composition comprising monodisperse particles, said monodisperse particles each having a surface, said surfaces bearing the same charge and having greater than 3.4 wt. % of pendant steric stabilizing groups, wherein the monodisperse particles self-assemble into a crystalline colloidal array.

13. The method of claim 12 wherein the particle surfaces have a minimum charge density of 1 $\mu C/cm2$.

14. The method of claim 12 wherein said pendant steric stabilizing groups comprise residues of polypropylene glycol, polyethylene glycol, polyvinylpyrrolidone, polyvinyl alcohol, poly(hydroxyethyl(meth)acrylate), poly(hydroxypropyl(meth)acrylate), polyacrylic acid, methacrylic acid, polyacrylamide, and/or poly(N-substituted acrylamide) and/or copolymers thereof.

15. The method of claim 12 wherein the coating composition further comprises a resinous binder.

16. A method of coating a substrate comprising:
depositing onto at least a portion of a substrate the dispersion of particles of claim 1 to form a crystalline colloidal array layer; and
depositing another coating composition onto at least a portion of the crystalline colloidal array layer.

17. The method of claim 16 wherein the other coating composition is a clearcoat composition.

18. The method of claim 16 further comprising depositing a first coating composition onto the substrate portion and depositing the dispersion of particles onto at least a portion of the first coating composition.

19. The method of claim 16 wherein dispersion of particles further comprises a resinous binder.

20. The method of claim 16 wherein said step of depositing the dispersion of particles comprises spraying the dispersion of particles.

* * * * *